(12) United States Patent
Zheng

(10) Patent No.: US 10,523,562 B2
(45) Date of Patent: Dec. 31, 2019

(54) METHOD FOR PROCESSING PACKET IN ACCESS NETWORK AND NETWORK DEVICE

(71) Applicant: HUAWEI TECHNOLOGIES CO., LTD., Shenzhen (CN)

(72) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 393 days.

(21) Appl. No.: 15/177,922

(22) Filed: Jun. 9, 2016

(65) Prior Publication Data

US 2016/0294689 A1     Oct. 6, 2016

Related U.S. Application Data

(63) Continuation of application No. PCT/CN2013/089292, filed on Dec. 12, 2013.

(51) Int. Cl.
*H04L 12/721* (2013.01)
*H04B 10/27* (2013.01)
*H04L 12/741* (2013.01)

(52) U.S. Cl.
CPC ............ *H04L 45/66* (2013.01); *H04B 10/27* (2013.01); *H04L 45/745* (2013.01); *H04Q 2213/1301* (2013.01); *H04Q 2213/13389* (2013.01)

(58) Field of Classification Search
None
See application file for complete search history.

(56) References Cited

U.S. PATENT DOCUMENTS

2008/0034364 A1* 2/2008 Lam .................. G06F 8/63
718/1
2008/0253771 A1* 10/2008 Noel .................. H04L 41/082
398/67

(Continued)

FOREIGN PATENT DOCUMENTS

CN     101150425 A     3/2008
CN     101594250 A     12/2009

(Continued)

OTHER PUBLICATIONS

Parol et al., "Towards networks of the future: SDN paradigm introduction to PON networking for business applications", 2013, pp. 829-836.*

(Continued)

*Primary Examiner* — Adnan Baig
(74) *Attorney, Agent, or Firm* — Slater Matsil, LLP

(57) ABSTRACT

This application provides a method for processing a packet in an access network. The method includes: receiving, by an access device, a layer 2 protocol packet sent by a central device, where a destination address of the layer 2 protocol packet is a MAC address of the access device; obtaining, flow table information according to the layer 2 protocol packet, and generating a flow table entry, where the flow table entry includes a match field and an instruction; receiving a service packet; and determining a matching flow table entry according to the service packet, and when the matching flow table entry is the generated flow table entry, processing the service packet according to the instruction in the generated flow table entry. According to the technical solution, the access device can obtain the flow table information from the central device without the need of configuring a public IP address.

15 Claims, 10 Drawing Sheets

(56) References Cited

U.S. PATENT DOCUMENTS

| | | |
|---|---|---|
| 2014/0019639 A1 | 1/2014 | Ueno |
| 2015/0140965 A1* | 5/2015 | Qiang ................ H04L 12/1407 455/410 |

FOREIGN PATENT DOCUMENTS

| | | |
|---|---|---|
| CN | 101635666 A | 1/2010 |
| CN | 102098165 A | 6/2011 |
| CN | 102882717 A | 1/2013 |
| WO | 2012/133290 A1 | 10/2012 |

OTHER PUBLICATIONS

Parol et al., "Towards networks of the future: SDN paradigm introduction to PON networking for business applications", Proceedings of the 2013 Federated Conference on Computer Science and Information Systems, IEEE, 2013, pp. 829-836.

Parol et al., "Towards networks of the future: SDN paradigm introduction to PON networking for business applications", Proceedings of the 2013 Federated Conference on Computer Science and Information Systems, IEEE, 2013, pp. 1-9 (pp. 832 left column-835 right column).

Woesner et al., "SDN and OpenFlow for Coverged Access/Aggregation Networks", OFC/NFOEC Technical Digest, Optical Society of America, 2013, pp. 1-3.

"Series G: Transmission Systems and Media Digital Systems and NetworksDigital sections and digital line system—Optical line systems for local and access networks ONU management and control interface (OMCI) specification", ITU-T G.988 Telecommunication Standardization Sector of ITU, International Telecommunication Union, Oct. 2012, pp. 1-594.

Extended European Search Report dated Nov. 16, 2016 in corresponding European Patent Application No. 13899036.1.

International Search Report and Written Opinion dated Sep. 29, 2014 in corresponding International Patent Application No. PCT/CN2013/089292.

International Search Report dated Sep. 29, 2014, in corresponding International Application No. PCT/CN2013/089292.

Chinese Search Report dated May 9, 2017 in corresponding Chinese Patent Application No. 2013800026147.

Chinese Office Action dated May 22, 2017 in corresponding Chinese Patent Application No. 201380002614.7.

* cited by examiner

| GEM header (GEM header) | Transaction correlation identifier (Transaction correlation identifier) | Message type (Message type) | Device identifier (Device identifier) | Message identifier (Message identifier) | Message contents (Message contents) | OMCI trailer (OMCI trailer) |

METHOD FOR PROCESSING PACKET IN ACCESS NETWORK AND NETWORK DEVICE

CROSS-REFERENCE TO RELATED APPLICATIONS

This application is a continuation of International Application No. PCT/CN2013/089292, filed on Dec. 12, 2013, which is hereby incorporated by reference in its entirety.

TECHNICAL FIELD

Embodiments of the present invention relate to the field of communications technologies, and in particular, to a method for processing a packet in an access network and a network device.

BACKGROUND

FIG. 1 is a schematic diagram of a network architecture of an optical access network. The optical access network includes a passive optical access network and an active optical access network. The passive optical access network includes: fiber to the x (FTTx), and the active optical access network includes: a Digital Subscriber Line Access Multiplexer (DSLAM). In the passive optical network, the DSLAM is connected to an Optical Line Terminal (OLT) through the Ethernet. According to a Optical Network Unit (ONU), the FTTX is classified into several situations: Fiber To The Home (FTTH), fiber to Distribution Point (FTTDp), fiber to the Building (FTTB), fiber to the Curb (FTTC), and the like. A Passive Optical Network (PON) technology is mainly used in a fiber access network. In the prior art, a PON mainly has two types: a Gigabit Passive Optical Network (GPON) and an Ethernet Passive Optical Network (EPON). The PON technology is a point-to-multipoint Optical Access Network (OAN) technology. A PON may include an OLT and an ONU, or a PON may include an OLT and an Optical Network Terminal (ONT), or a PON may include an OLT and a Multi-Dwelling Unit (MDU). In the network architecture of the optical access network shown in FIG. 1, an ONU, an ONT, an MDU, or a DSLAM may be collectively referred to as an access device. An OLT may be referred to as a central device. Customer Premises Equipment (CPE) is connected to an Internet Protocol (IP) network by using an access device and a central device.

In the prior art, in an optical access network, a central device (for example, an OLT) or a Dynamic Host Configuration Protocol (DHCP) server needs to configure one public IP address for each access device, such as an ONU, an ONT, an MDU, or a DSLAM, so as to implement that user equipment accesses an IP network by using the access device. In this way, a public IP address needs to be configured for each access device, which results in complex management and difficult maintenance of the access device.

SUMMARY

Embodiments of the present invention provide a method for processing a packet in an access network and a network device, which are used to resolve a technical problem in the prior art that a public IP address needs to be configured for each access device, and that causes complex management and difficult maintenance of the access device.

According to a first aspect, a method for processing a packet in an access network is provided, where the method includes:

receiving, by an access device, a layer 2 protocol packet sent by a central device, where a destination address of the layer 2 protocol packet is a Media Access Control (MAC) address of the access device, the access device is configured to connect to user equipment, and the central device is configured to connect the access device to an IP network;

obtaining, by the access device, flow table information according to the layer 2 protocol packet, where the flow table information includes a match field and an instruction, and generating, by the access device, a flow table entry according to the flow table information, where the flow table entry includes the match field and the instruction;

receiving, by the access device, a service packet sent by the user equipment; and determining, by the access device, a matching flow table entry according to the service packet, and when the matching flow table entry is the generated flow table entry, processing the service packet according to the instruction in the generated flow table entry.

With reference to the first aspect, in a first possible implementation manner of the first aspect, when a GPON or a next-generation GPON is between the access device and the central device, the central device is an OLT, the access device is an optical network unit ONU, and the layer 2 protocol packet is an ONT management and control interface (OMCI) protocol packet.

According to the first possible implementation manner of the first aspect, a second possible implementation manner of the first aspect is further provided, where in the second possible implementation manner of the first aspect, the OMCI protocol packet carries an OpenFlow (OpenFlow) message, where the OpenFlow message carries the flow table information, and the OMCI protocol packet includes a first message identifier, where the first message identifier is used to identify that the OMCI protocol packet carries the OpenFlow message; and the obtaining, by the access device, flow table information according to the layer 2 protocol packet includes:

when the access device determines that the OMCI protocol packet carries the first message identifier, obtaining, by the access device, the flow table information according to the OpenFlow message carried in the OMCI protocol packet.

According to the first possible implementation manner of the first aspect, a third possible implementation manner of the first aspect is further provided, where in the third possible implementation manner of the first aspect, the OMCI protocol packet carries a uniform resource identifier (Uniform Resource Identifier, URI) of a configuration file, and the OMCI protocol packet includes a second message identifier, where the second message identifier is used to identify that the OMCI protocol packet carries the URI; and the obtaining, by the access device, flow table information according to the layer 2 protocol packet includes:

when the access device determines that the OMCI protocol packet carries the second message identifier, accessing, by the access device, the configuration file according to the URI, to obtain the flow table information from the configuration file.

According to the third possible implementation manner of the first aspect, a fourth possible implementation manner of the first aspect is further provided, where in the fourth possible implementation manner of the first aspect, the configuration file further includes line management information, where the line management information includes: a type of an access line on a user side of the access device and a physical layer parameter of the access line, and the line management information is used by the access device to configure and manage the access line; and the method further includes:

accessing, by the access device, the configuration file according to the URI of the configuration file, to obtain the line management information from the configuration file.

With reference to the first aspect, in a fifth possible implementation manner of the first aspect, when an EPON or a next-generation EPON is between the access device and the central device, the central device is an OLT, the access device is an ONU, and the layer 2 protocol packet is an Ethernet (Ethernet) packet.

With reference to the first aspect, in a sixth possible implementation manner of the first aspect, when either of an Ethernet network and an IP network is between the access device and the central device, the central device is either of an edge device of the IP network and an OLT, the access device is a DSLAM, and the layer 2 protocol packet is an Ethernet packet.

According to the fifth and sixth possible implementation manners of the first aspect, a seventh possible implementation manner of the first aspect is further provided, where in the seventh possible implementation manner of the first aspect, a payload part of the Ethernet packet carries an OpenFlow message, and the Ethernet packet includes a third message identifier, where the third message identifier is used to identify that the Ethernet packet carries the OpenFlow message; and the obtaining, by the access device, flow table information according to the Ethernet packet includes:

when the access device determines that the Ethernet packet carries the third message identifier, obtaining, by the access device, the flow table information according to the OpenFlow message carried in the payload part of the Ethernet packet.

According to the fifth and sixth possible implementation manners of the first aspect, an eighth possible implementation manner of the first aspect is further provided, where in the eighth possible implementation manner of the first aspect, the Ethernet packet carries a URI of a configuration file, and the Ethernet packet includes a fourth message identifier, where the fourth message identifier is used to identify that the Ethernet packet carries the URI; and the obtaining, by the access device, flow table information according to the layer 2 protocol packet includes:

when the access device determines that the Ethernet packet carries the fourth message identifier, accessing, by the access device, the configuration file according to the URI, carried in the Ethernet packet, of the configuration file, to obtain the flow table information from the configuration file.

According to the eighth possible implementation manner of the first aspect, a ninth possible implementation manner of the first aspect is further provided, where in the ninth possible implementation manner of the first aspect, the configuration file further includes line management information, where the line management information includes: a type of an access line on a user side of the access device and a physical layer parameter of the access line, and the line management information is used by the access device to configure and manage the access line; and the method further includes:

accessing, by the access device, the configuration file according to the URI carried in the Ethernet packet, to obtain the line management information from the configuration file.

According to a second aspect, an access device in an access network is provided, where the access device includes:

a receiving unit, configured to receive a layer 2 protocol packet sent by a central device, where a destination address of the layer 2 protocol packet is a MAC address of the access device, the access device is configured to connect to user equipment, and the central device is configured to connect the access device to an IP network;

a generation unit, configured to obtain flow table information according to the layer 2 protocol packet received by the receiving unit, where the flow table information includes a match field and an instruction, and generate a flow table entry according to the flow table information, where the flow table entry includes the match field and the instruction, where the receiving unit is further configured to receive a service packet sent by the user equipment; and a processing unit, configured to perform flow table matching for the service packet, and when the flow table entry is found by means of the matching, forward the service packet according to the instruction in the flow table entry.

With reference to the second aspect, in a first possible implementation manner of the second aspect, when a GPON or a next-generation GPON is between the access device and the central device, the central device is an OLT, the access device is an ONU, and the layer 2 protocol packet received by the receiving unit is an ONT management and control interface OMCI protocol packet.

According to the first possible implementation manner of the second aspect, a second possible implementation manner of the second aspect is further provided, where in the second possible implementation manner of the second aspect, the OMCI protocol packet received by the receiving unit carries an OpenFlow message, where the OpenFlow message carries the flow table information, and the OMCI protocol packet includes a first message identifier, where the first message identifier is used to identify that the OMCI protocol packet carries the OpenFlow message; and the obtaining, by the generation unit, flow table information according to the layer 2 protocol packet includes:

when the access device determines that the OMCI protocol packet carries the first message identifier, obtaining, by the access device, the flow table information according to the OpenFlow message carried in the OMCI protocol packet.

According to the first possible implementation manner of the second aspect, a third possible implementation manner of the second aspect is further provided, where in the third possible implementation manner of the second aspect, the OMCI protocol packet received by the receiving unit carries a URI of a configuration file, and the OMCI protocol packet includes a second message identifier, where the second message identifier is used to identify that the OMCI protocol packet carries the URI; and the obtaining, by the generation unit, flow table information according to the layer 2 protocol packet includes:

when the generation unit determines that the OMCI protocol packet carries the second message identifier, accessing, by the generation unit, the configuration file according to the URI, to obtain the flow table information from the configuration file.

According to the third possible implementation manner of the second aspect, a fourth possible implementation manner of the second aspect is further provided, where in the fourth possible implementation manner of the second aspect, the configuration file further includes line management information, where the line management information includes: a type of an access line on a user side of the access device and a physical layer parameter of the access line, and the line management information is used by the access device to configure and manage the access line; and the access device further includes:

an acquiring unit, configured to access the configuration file according to the URI of the configuration file, to obtain the line management information from the configuration file.

In a fifth possible implementation manner of the second aspect, when an Ethernet passive optical network EPON or a next-generation EPON is between the access device and the central device, the central device is an OLT, the access device is an ONU, and the layer 2 protocol packet received by the receiving unit is an Ethernet Ethernet packet.

In a sixth possible implementation manner of the second aspect, when either of an Ethernet network and an IP network is between the access device and the central device, the central device is either of an edge device of the IP network and an OLT, the access device is a DSLAM, and the layer 2 protocol packet received by the receiving unit is an Ethernet packet.

According to the fifth and sixth possible implementation manners of the second aspect, a seventh possible implementation manner of the second aspect is further provided, where in the seventh possible implementation manner of the second aspect, a payload part of the Ethernet packet carries an OpenFlow message, and the Ethernet packet includes a third message identifier, where the third message identifier is used to identify that the Ethernet packet carries the OpenFlow message; and the obtaining, by the generation unit, flow table information according to the Ethernet packet includes:

obtaining, by the generation unit, the flow table information according to the OpenFlow message carried in the payload part of the Ethernet packet.

According to the fifth and sixth possible implementation manners of the second aspect, an eighth possible implementation manner of the second aspect is further provided, where in the eighth possible implementation manner of the second aspect, the Ethernet packet carries a uniform resource identifier URI of a configuration file, and the Ethernet packet includes a fourth message identifier, where the fourth message identifier is used to identify that the Ethernet packet carries the URI; and the obtaining, by the generation unit, flow table information according to the layer 2 protocol packet includes:

when the generation unit determines that the Ethernet packet carries the fourth message identifier, accessing, by the generation unit, the configuration file according to the URI, carried in the Ethernet packet, of the configuration file, to obtain the flow table information from the configuration file.

According to the eighth possible implementation manner of the second aspect, a ninth possible implementation manner of the second aspect is further provided, where in the ninth possible implementation manner of the second aspect, the configuration file further includes line management information, where the line management information includes: a type of an access line on a user side of the access device and a physical layer parameter of the access line, and the line management information is used by the access device to configure and manage the access line; and the access device further includes:

an acquiring unit, configured to access the configuration file according to the URI carried in the Ethernet packet, to obtain the line management information from the configuration file.

According to a third aspect, a central device in an access network is provided, where the central device includes:

a generation unit, configured to generate a layer 2 protocol packet, where a destination address of the layer 2 protocol packet is a MAC address of an access device, the layer 2 protocol packet carries flow table information, the central device is configured to connect the access device to an IP network, and the access device is configured to connect to user equipment; and a sending unit, configured to send the layer 2 protocol packet generated by the generation unit to the access device.

With reference to the third aspect, in a first possible implementation manner of the third aspect, when a GPON or a next-generation GPON is between the access device and the central device, the central device is an OLT, the access device is an ONU, the layer 2 protocol packet is an ONT management and control interface OMCI protocol packet, the OMCI protocol packet carries an OpenFlow message, and the OpenFlow message carries the flow table information.

With reference to the third aspect, in a second possible implementation manner of the third aspect, when an Ethernet passive optical network EPON or a next-generation EPON is between the access device and the central device, the central device is an OLT, the access device is an ONU, and the layer 2 protocol packet is an Ethernet Ethernet packet, a payload part of the Ethernet packet carries an OpenFlow message, and the OpenFlow message carries the flow table information.

In the technical solutions provided in the embodiments of the present invention, an access device receives a layer 2 protocol packet sent by a central device; obtains flow table information by using the layer 2 protocol packet, and generates a corresponding flow table entry, where the flow table entry includes a match field and an instruction; the access device receives a service packet sent by user equipment; the access device determines a matching flow table entry according to the service packet, and when the matching flow table entry is the generated flow table entry, processes the service packet according to the instruction in the generated flow table entry. According to the technical solutions, the access device can obtain the flow table information from the central device without the need of configuring a public IP address for the access device, so as to help implement that the user equipment accesses an IP network by using the access device, and a forwarding entry no longer needs to be independently configured, which helps simplify management and maintenance of the access device.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
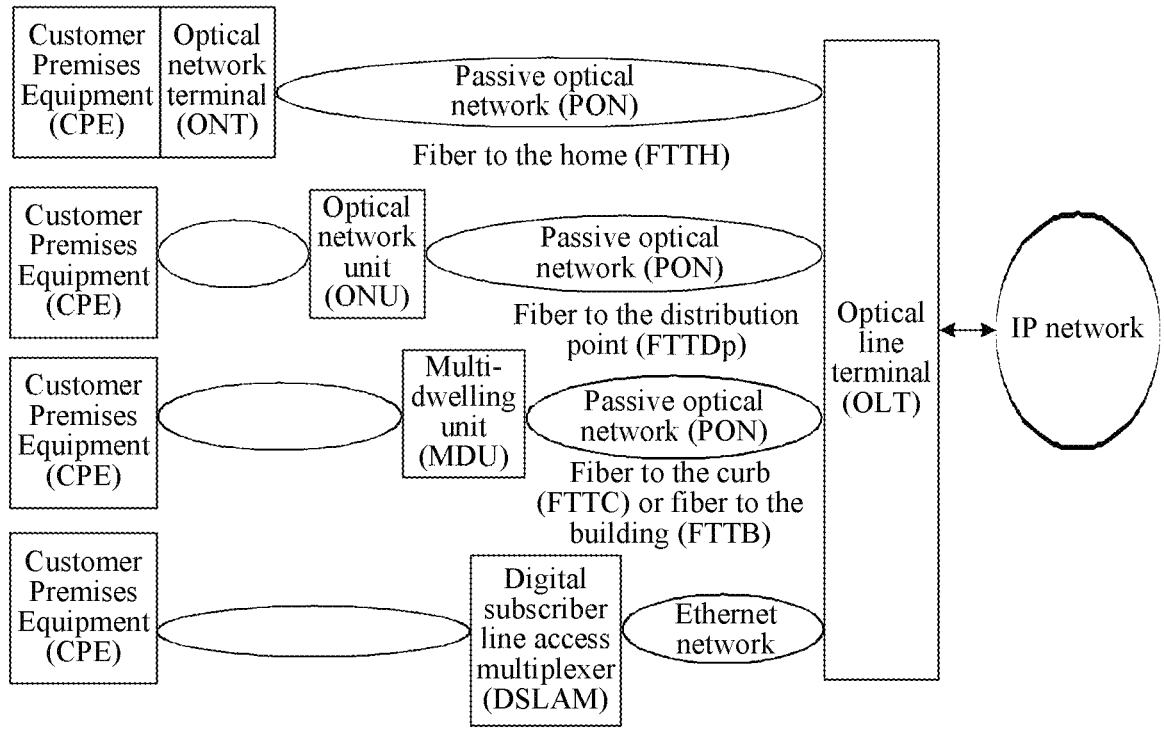
FIG. 1 is a schematic diagram of a network architecture of an optical access network in the prior art.
Figure 2:
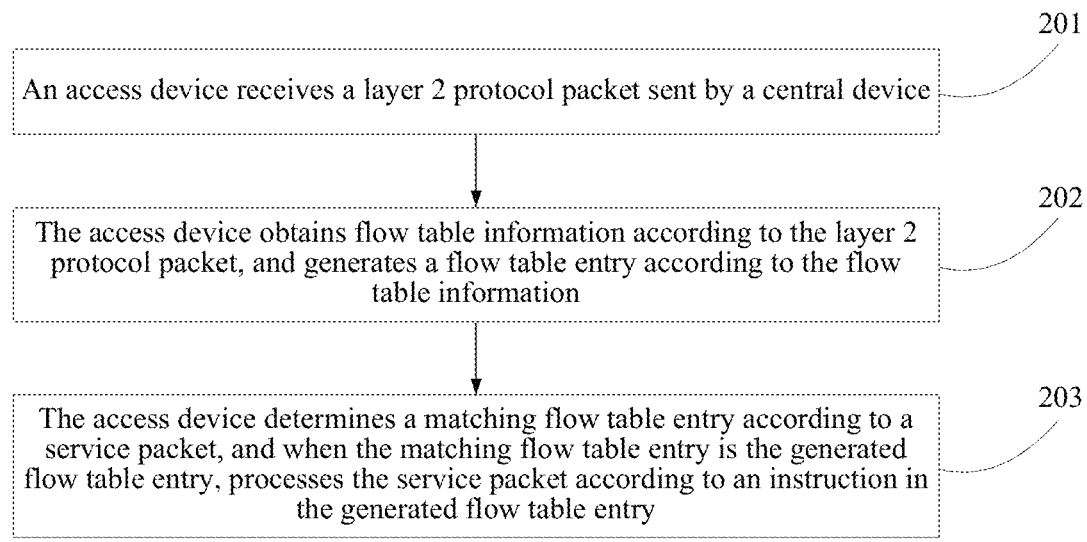
FIG. 2 is a schematic flowchart of a method for processing a packet in an access network according to an embodiment of the present invention.

Referring to FIG. 2, an embodiment of the present invention provides a method for processing a packet in an access network. The method includes:

201: An access device receives a layer 2 protocol packet sent by a central device, where a destination address of the layer 2 protocol packet is a MAC address of the access device, the access device is configured to connect to user equipment, and the central device is configured to connect the access device to an IP network.

202: The access device obtains flow table information according to the layer 2 protocol packet, where the flow table information includes a match field and an instruction, and the access device generates a flow table entry according to the flow table information, where the flow table entry includes the match field and the instruction.

203: The access device receives a service packet sent by the user equipment.

204: The access device determines a matching flow table entry according to the service packet, and when the matching flow table entry is the generated flow table entry, processes the service packet according to the instruction in the generated flow table entry.

Optionally, the flow table information may be layer 2 forwarding table information or layer 3 forwarding table information, or may be flow table information defined in the OpenFlow protocol; correspondingly, the flow table entry that is generated by the access device according to the flow table information may be a layer 2 forwarding entry, a layer 3 forwarding entry, or a flow table entry defined in the OpenFlow. The flow table entry is used by the user equipment to access the IP network by using the access device.

Optionally, when a GPON or a next-generation GPON is between the access device and the central device, the central device is an OLT, the access device is an ONU, and the layer 2 protocol packet is an OMCI protocol packet.

Optionally, the OMCI protocol packet carries an OpenFlow message, where the OpenFlow message carries the flow table information, and the OMCI protocol packet includes a first message identifier, where the first message identifier is used to identify that the OMCI protocol packet carries the OpenFlow message; and the obtaining, by the access device, flow table information according to the layer 2 protocol packet includes:

when the access device determines that the OMCI protocol packet carries the first message identifier, obtaining, by the access device, the flow table information according to the OpenFlow message carried in the OMCI protocol packet, where the OpenFlow message may be an OpenFlow message of a controller-to-switch type, and for the OpenFlow message of a controller-to-switch type, reference may be made to the OpenFlow Switch Specification Version 1.0.0 released by the Open Networking Foundation (Open Networking Foundation, ONF).

Figures 3, 3A:
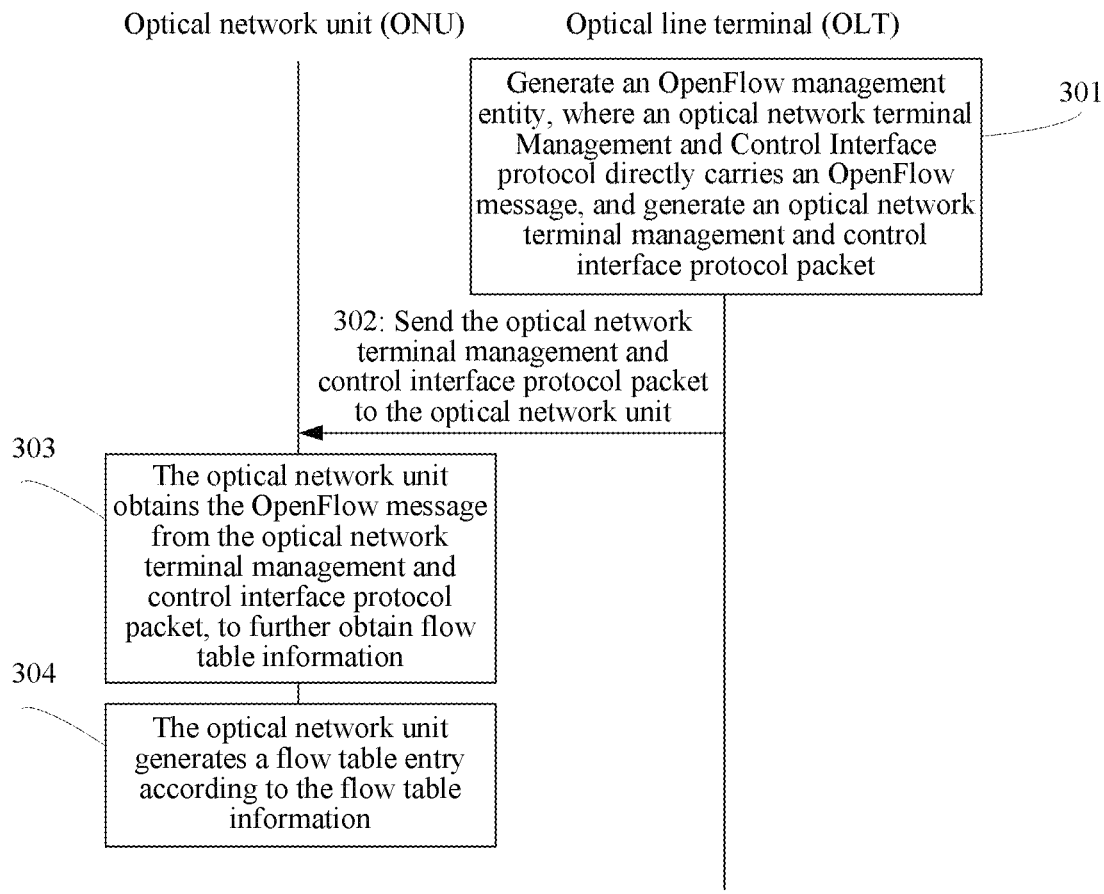
FIG. 3 is a schematic diagram of an interaction process between an ONU and an OLT according to an embodiment of the present invention.
FIG. 3a is a schematic diagram of a format of an OMCI protocol packet according to an embodiment of the present invention.

Referring to FIG. 3, FIG. 3 is a schematic diagram of an interaction process between the ONU and the OLT when the ONU obtains the flow table information by using the OMCI protocol packet. The interaction process includes the following steps:

301: The OLT generates a first OpenFlow management entity (Management Entity, ME). The first OpenFlow ME is configured to manage a flow table, and the OLT generates the OMCI protocol packet by using the first OpenFlow ME. A format of the first OpenFlow ME is as follows:

attribute field (Attributes):

an ME identifier (ID), used to identify the first OpenFlow ME;

an OpenFlow version (Version), used to identify an OpenFlow version number of the OpenFlow message; and an OpenFlow Message, used to carry the OpenFlow message; and action field (Actions):

create (Create), used to create the first OpenFlow ME or create an attribute of the first OpenFlow ME;

delete (Delete), used to delete the first OpenFlow ME or an attribute of the first OpenFlow ME;

get (Get), used to get all attributes of the first OpenFlow ME or an attribute of the first OpenFlow ME; and set (Set), used to set all attributes of the first OpenFlow ME or an attribute of the first OpenFlow ME.

The OMCI protocol packet includes the OpenFlow version number of the OpenFlow message and the OpenFlow message, the first message identifier of the OMCI protocol packet is generated according to the ME ID of the first OpenFlow ME, and a specific generation manner is not limited in this embodiment of the present invention. A packet format of the OMCI protocol packet is shown in FIG. 3a, and the OMCI protocol packet includes:

a GPON encapsulation method (GPON Encapsulation Method, GEM) message header field, a transaction correlation identifier (Transaction correlation identifier) field, a message type (Message type) field, a device identifier (Device identifier) field, a message identifier (Message identifier) field, a message content (Message contents) field, and an OMCI trailer (OMCI trailer) field. For specific meanings of the fields, refer to G.984.4(06/2004) of the International Telecommunication Union Telecommunication Standardization Sector (International Telecommunication Union Telecommunication Standardization Sector, ITU-T). In this embodiment of the present invention, the Message identifier of the OMCI protocol packet carries the first message identifier, and the Message contents in the OMCI protocol packet carries the OpenFlow message.

302: The OLT sends the OMCI protocol packet to the ONU.

303: The ONU obtains the OpenFlow message from the OMCI protocol packet, to further obtain the flow table information.

304: The ONU generates the flow table entry according to the flow table information.

After generating the flow table entry, the ONU may forward, according to the flow table entry, the service packet received from the user equipment. According to the foregoing process, the ONU can still obtain the flow table information from the central device without the need of independently configuring a public IP address for the ONU, so as to implement that the user equipment is connected to an IP network by using the ONU, and a forwarding entry no longer needs to be independently configured, which helps simplify management and maintenance of the ONU.

Optionally, after step 304, the interaction process may further include:

feeding back, by the ONU, a flow table entry generation result to the OLT by using the OMCI protocol, so that the OLT determines whether to repeatedly send the OMCI protocol packet including the flow table information to the ONU.

Optionally, the OMCI protocol packet carries a URI of a configuration file, and the OMCI protocol packet includes a second message identifier, where the second message identifier is used to identify that the OMCI protocol packet carries the URI, and the obtaining, by the access device, flow table information according to the layer 2 protocol packet includes:

when the access device determines that the OMCI protocol packet carries the second message identifier, accessing, by the access device, the configuration file according to the URI, to obtain the flow table information from the configuration file.

Figure 4:
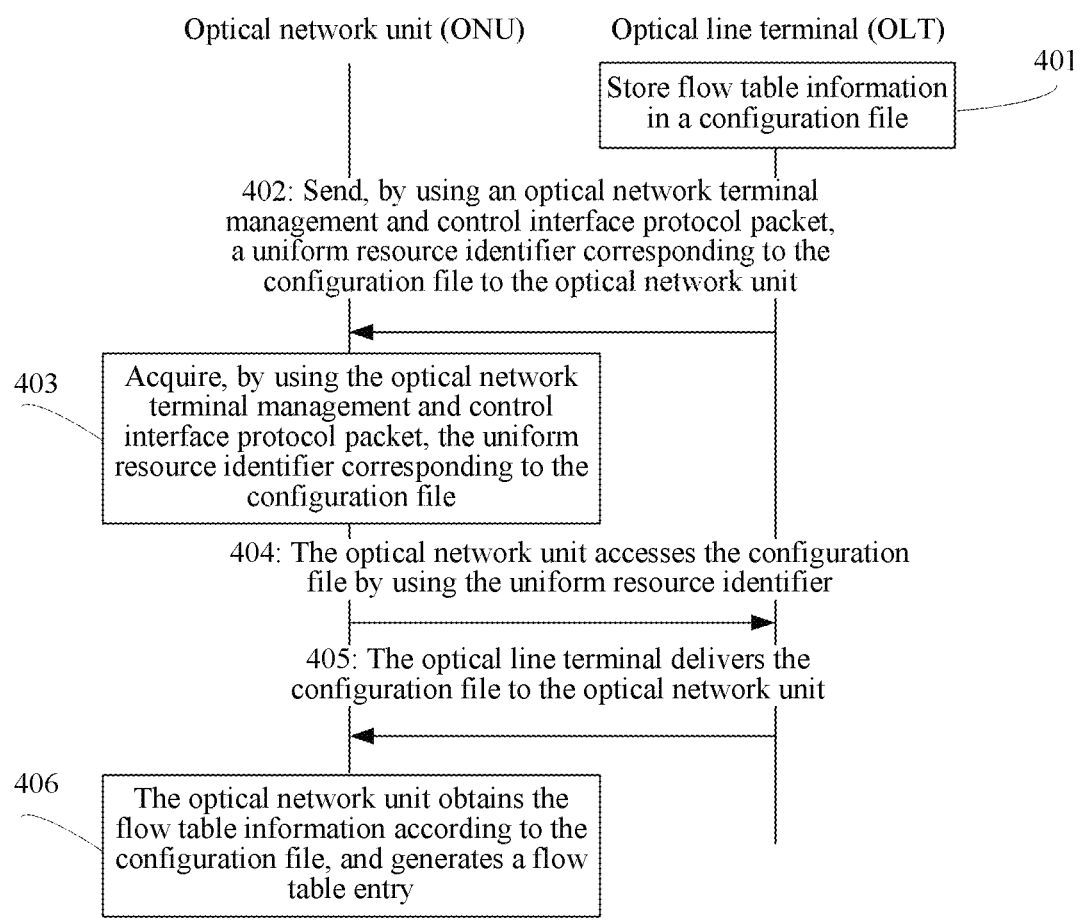
FIG. 4 is a schematic diagram of an interaction process between an ONU and an OLT according to an embodiment of the present invention.

Referring to FIG. 4, FIG. 4 is a schematic diagram of an interaction process between the ONU and the OLT when the ONU obtains the flow table information from the configuration file, when the OMCI protocol packet carries the URI of the configuration file. The interaction process includes the following steps:

401: The OLT stores the flow table information in the configuration file. The configuration file may be stored in a specific network device, and in this embodiment of the present invention, an example in which the configuration file is stored in the OLT is used. The configuration file may further be stored in a network management device or a server.

402: The OLT generates a second OpenFlow ME, where the OpenFlow ME is configured to manage the configuration file, and the OLT generates the OMCI protocol packet by using the second OpenFlow ME. The OLT sends, by using the OMCI protocol, the URI corresponding to the configuration file to the ONU. A format of the second OpenFlow ME is as follows:

attribute field (Attributes):

an ME identifier (ID), used to identify the second OpenFlow ME; and a URI field, used to identify the URI corresponding to the configuration file; and action field (Actions):

create (Create), used to create the second OpenFlow ME or create an attribute of the second OpenFlow ME;

delete (Delete), used to delete the second OpenFlow ME or an attribute of the second OpenFlow ME;

get (Get), used to get all attributes of the second OpenFlow ME or an attribute of the second OpenFlow ME; and set (Set), used to set all attributes of the second OpenFlow ME or an attribute of the second OpenFlow ME.

The OMCI protocol packet includes the URI field of the second OpenFlow ME, the second message identifier of the OMCI protocol packet is generated according to the ME ID of the second OpenFlow ME, and a specific generation manner is not limited in this embodiment of the present invention.

In this embodiment of the present invention, when the OMCI protocol packet carries the URI of the configuration file, the Message identifier in the OMCI protocol packet carries the second message identifier, and the Message contents in the OMCI protocol packet carries the URI.

403: The ONU acquires, by using the OMCI protocol, the URI corresponding to the configuration file.

404: The ONU accesses the configuration file by using the URI. When the configuration file is stored in the OLT, the ONU accesses the configuration file in the OLT by using the URI; when the configuration file is stored in another network device, the ONU accesses the another network device by using the URI to acquire the configuration file.

405: The OLT delivers the configuration file to the ONU.

406: The ONU obtains the flow table information according to the configuration file, and generates a flow table entry.

According to the foregoing technical solution, an access device receives a layer 2 protocol packet sent by a central device, obtains flow table information by using the layer 2 protocol packet, and generates a flow table entry. An ONU can obtain the flow table information from the central device without the need of independently configuring a public IP address for the ONU and without the need of operating Transmission Control Protocol/Internet Protocol (Transmission Control Protocol/Internet Protocol, TCP/IP), so as to help implement that user equipment accesses an IP network by using the access device, avoiding a waste of a public IP address; moreover, an OLT controls delivery of all flow table information together, and the ONU does not need to independently configure a flow table entry, which helps simplify management and maintenance of the ONU.

Optionally, the configuration file further includes line management information, where the line management information includes: a type of an access line on a user side of the access device and a physical layer parameter of the access line, and the line management information is used by the access device to configure and manage the access line; and the method further includes:

accessing, by the access device, the configuration file according to the URI of the configuration file, to obtain the line management information from the configuration file, where the access device acquires the line management information from the configuration file, which avoids a technical problem in the prior art that multiple MEs need to be generated when the central device needs to deliver the line management information including multiple pieces of parameter information and that causes management and maintenance difficulties.

Figure 5:
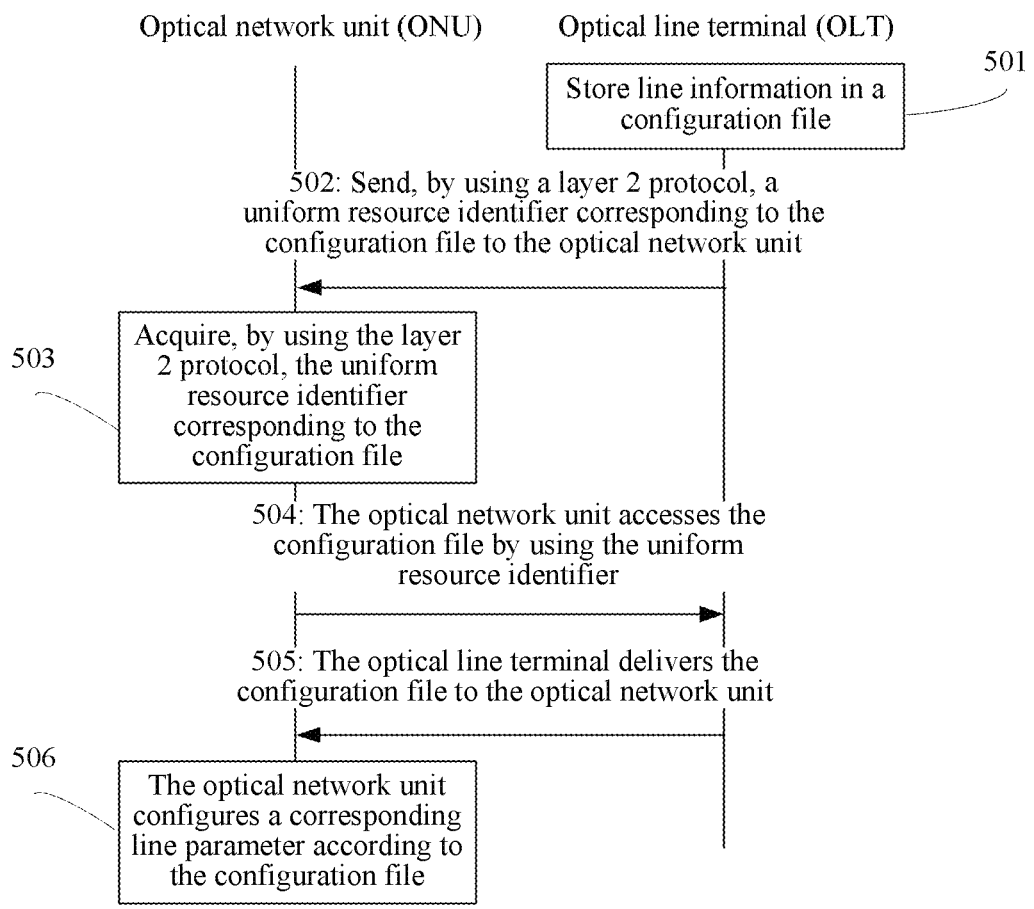
FIG. 5 is a schematic diagram of an interaction process between an ONU and an OLT according to an embodiment of the present invention.

Referring to FIG. 5, FIG. 5 is a schematic diagram of an interaction process between the ONU and the OLT when the ONU obtains the line management information by using the layer 2 protocol packet. The interaction process includes the following steps:

501: The OLT stores the line management information in the configuration file. The configuration file may be stored in a specific network device, and in this embodiment of the present invention, an example in which the configuration file is stored in the OLT is used. The configuration file may further be stored in a network management device or a server.

502: The OLT sends, by using the layer 2 protocol, the URI corresponding to the configuration file to the ONU.

503: The ONU acquires, by using the layer 2 protocol, the URI corresponding to the configuration file.

504: The ONU accesses the configuration file by using the URI. When the configuration file is stored in the OLT, the ONU accesses the configuration file in the OLT by using the URI; when the configuration file is stored in another network device, the ONU accesses the another network device by using the URI to acquire the configuration file.

505: The OLT delivers the configuration file to the ONU.

506: The ONU configures a corresponding line parameter according to the configuration file. The line management information is stored in the configuration file, and the ONU configures the access device according to the line management information, to configure and manage the access line.

Optionally, when an EPON or a next-generation EPON is between the access device and the central device, the central device is an OLT, the access device is an ONU, and the layer 2 protocol packet is an Ethernet Ethernet packet.

Optionally, a payload part of the Ethernet packet carries an OpenFlow message, and the Ethernet packet includes a third message identifier, where the third message identifier is used to identify that the Ethernet packet carries the OpenFlow message, and the obtaining, by the access device, flow table information according to the Ethernet packet includes:

when the access device determines that the Ethernet packet carries the third message identifier, obtaining, by the access device, the flow table information according to the OpenFlow message carried in the payload part of the Ethernet packet, where the OpenFlow message is transmitted directly as a payload of the Ethernet packet, and IP packet encapsulation is no longer performed on the Ethernet packet.

Figure 6:
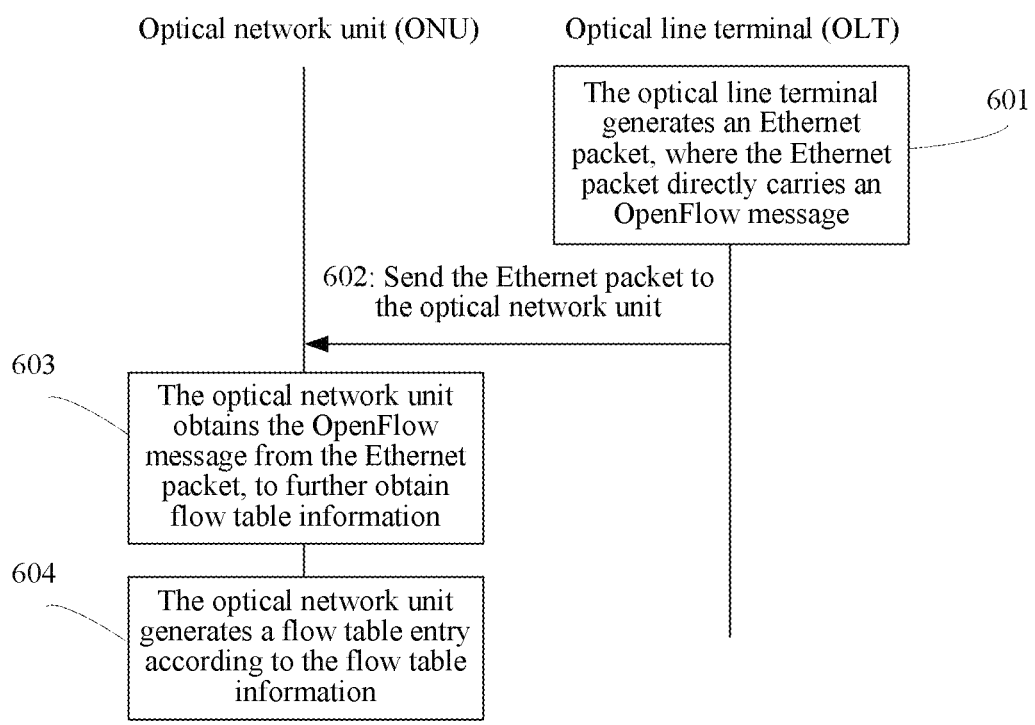
FIG. 6 is a schematic diagram of an interaction process between an ONU and an OLT according to an embodiment of the present invention.

Referring to FIG. 6, FIG. 6 is a schematic diagram of an interaction process between the ONU and the OLT when the ONU obtains the flow table information by using the layer 2 protocol packet. The interaction process includes the following steps:

601: The OLT generates the Ethernet packet, where the payload part of the Ethernet packet carries the OpenFlow message.

602: The OLT sends the Ethernet packet to the ONU.

603: The ONU obtains the OpenFlow message from the Ethernet packet, to further obtain the flow table information.

604: The ONU generates the flow table entry according to the flow table information.

Optionally, after step 604, the interaction process may further include:

feeding back, by the ONU, a flow table entry generation result to the OLT by using the Ethernet packet, so that the OLT determines whether to repeatedly send the Ethernet packet including the flow table information to the ONU.

Figure 7A:
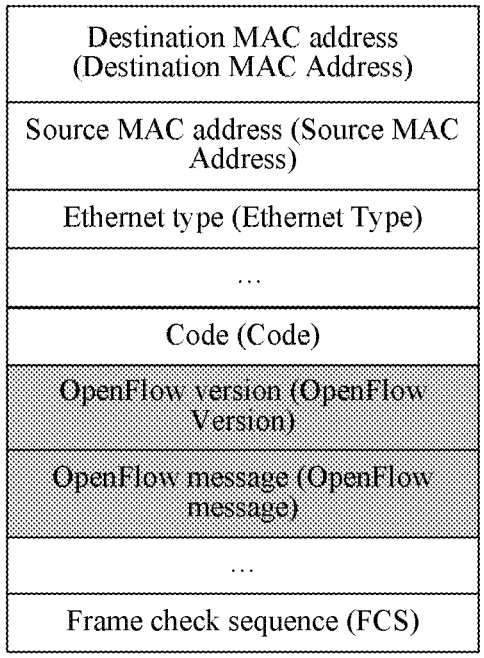
FIG. 7a is a schematic diagram of a format of an Ethernet packet according to an embodiment of the present invention.

Referring to FIG. 7a, FIG. 7a shows a format of the Ethernet packet, where the Ethernet packet includes:

a destination Media Access Control (Media Access Control, MAC) address (Destination MAC Address) field, used to carry a MAC address of the access device;

a source MAC address (Source MAC Address) field, used to carry a MAC address of the central device;

an Ethernet Type (Ethernet Type) field, used to identify that the Ethernet packet is a slow protocol packet, where
  the Ethernet Type field may be set to 88-09;
  a code (Code) field, used to identify that the Ethernet packet carries the OpenFlow message, where the Code field may be set to 0xFE;
  an OpenFlow version (OpenFlow Version) field, used to identify a version type of the OpenFlow message;
  an OpenFlow message (OpenFlow message) field, used to carry the OpenFlow message; and
  a frame check sequence (Frame Check Sequence, FCS) field, used to perform frame check on the Ethernet packet.

The Code field is used to carry the third message identifier, where the third message identifier may be set to 0xFE.

Optionally, FIG. 7a shows the Ethernet packet, where the packet may further include:

a subtype (Subtype) field, used to identify that the Ethernet packet is an Operation, Administration and Maintenance (OAM) packet.

Optionally, in the Ethernet packet shown in FIG. 7a, a Subtype field may further be used to identify that the Ethernet packet carries the OpenFlow message, the Subtype field may be set to 0xFE, and in this case, a value of the Code field may not be limited. The Subtype field may carry the third message identifier, and the third message identifier may be set to 0xFE.

Optionally, in the Ethernet packet shown in FIG. 7a, the Ethernet Type field may further be used to identify that the Ethernet packet carries the OpenFlow message, and a value of the Ethernet Type field may be 0x88b5, 0x88b6, or 0x88b7. The Ethernet Type field may carry the third message identifier, and the third message identifier may be set to 0x88b5, 0x88b6, or 0x88b7.

Optionally, the Ethernet packet carries a URI of a configuration file, and the Ethernet packet includes a fourth message identifier, where the fourth message identifier is used to identify that the Ethernet packet carries the URI, and the obtaining, by the access device, flow table information according to the layer 2 protocol packet includes:

when the access device determines that the Ethernet packet carries the fourth message identifier, accessing, by the access device, the configuration file according to the URI, carried in the Ethernet packet, of the configuration file, to obtain the flow table information from the configuration file.

Optionally, the configuration file further includes line management information, where the line management information includes: a type of an access line on a user side of the access device and a physical layer parameter of the access line, and the line management information is used by the access device to configure and manage the access line; and the method further includes:

accessing, by the access device, the configuration file according to the URI carried in the Ethernet packet, to obtain the line management information from the configuration file.

Optionally, when an Ethernet network or an IP network is between the access device and the central device, the central device is an edge device of the IP network or an OLT, the access device is a digital subscriber line access multiplexer DSLAM, and the layer 2 protocol packet is an Ethernet packet. The format of the Ethernet packet is already described in FIG. 7a, and is not described herein again.

Figure 7B:
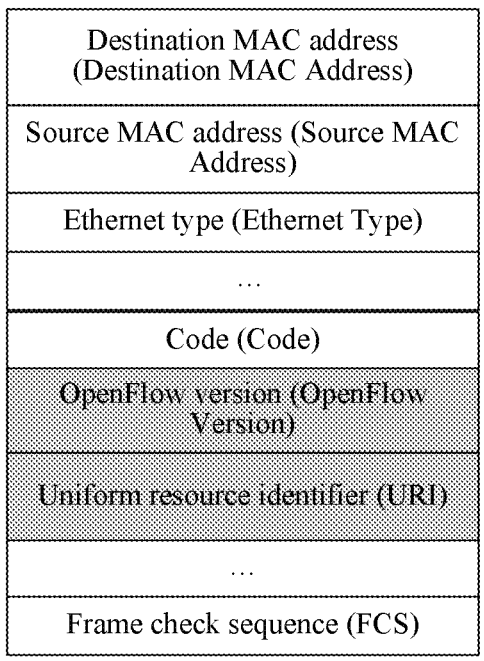
FIG. 7b is a schematic diagram of a format of an Ethernet packet according to an embodiment of the present invention.

When the Ethernet packet carries the URI of the configuration file, for the format of the Ethernet packet, refer to FIG. 7b, where:

a destination Media Access Control (Media Access Control, MAC) address (Destination MAC Address) field, used to carry a MAC address of the access device;

a source MAC address (Source MAC Address) field, used to carry a MAC address of the central device;

an Ethernet Type (Ethernet Type) field, used to identify that the Ethernet packet is a slow protocol packet, where
the Ethernet Type field may be set to 88-09;

a code (Code) field, used to identify that the Ethernet packet carries the URI corresponding to the configuration file, where the Code field may be set to 0xFE;

a URI field, used to carry the URI of the configuration file; and a frame check sequence (Frame Check Sequence, FCS) field, used to perform frame check on the Ethernet packet.

The Code field is used to carry the fourth message identifier, where the fourth message identifier may be set to 0xFE.

Optionally, in the Ethernet packet shown in FIG. 7b, the Subtype field may further be used to identify that the Ethernet packet carries the URI corresponding to the configuration file, where the Subtype field may be set to 0xFE. The Subtype field may carry the fourth message identifier, and the fourth message identifier may be set to 0xFE.

Optionally, in the Ethernet packet shown in FIG. 7b, the Ethernet Type field may further be used to identify that the Ethernet packet carries the URI corresponding to the configuration file, and a value of the Ethernet Type field may be 0x88b5, 0x88b6, or 0x88b7. The Ethernet Type field may carry the fourth message identifier, and the fourth message identifier may be set to 0x88b5, 0x88b6, or 0x88b7.

Figure 8:
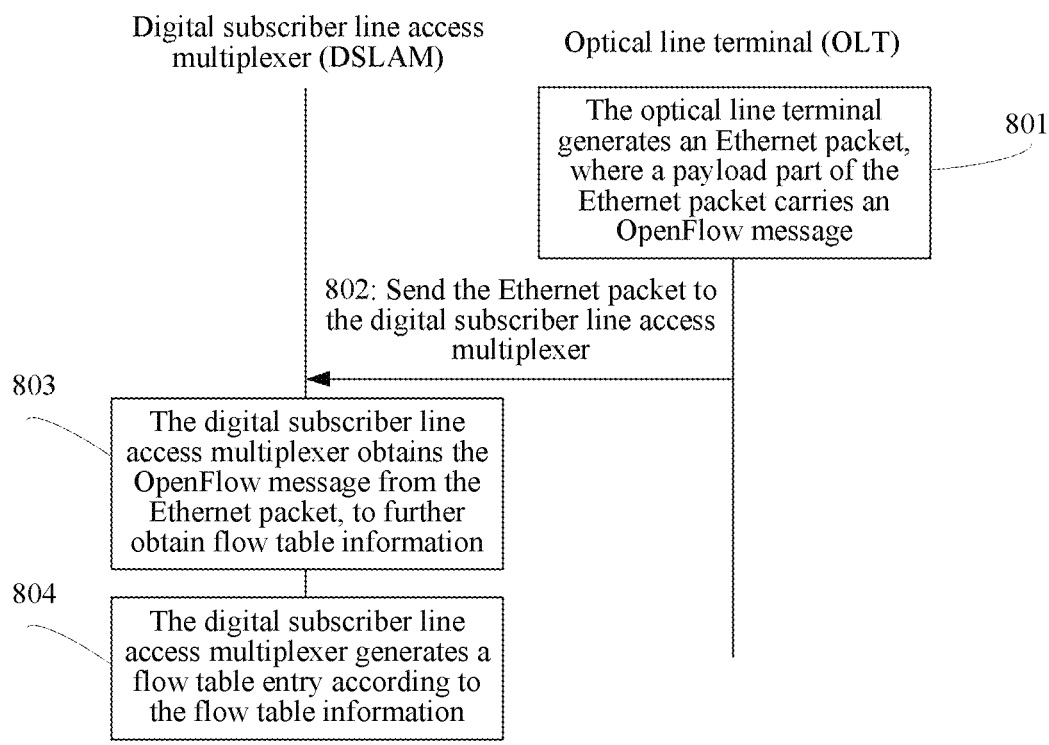
FIG. 8 is a schematic diagram of an interaction process between a DSLAM and an OLT according to an embodiment of the present invention.

Referring to FIG. 8, FIG. 8 is a schematic diagram of an interaction process between the DSLAM and the OLT when the ONU obtains the flow table information by using the layer 2 protocol packet. The interaction process includes the following steps:

801: The OLT generates the Ethernet packet, where the Ethernet packet directly carries the OpenFlow message.

802: The OLT sends the Ethernet packet to the DSLAM.

803: The DSLAM obtains the OpenFlow message from the Ethernet packet, to further obtain the flow table information.

804: The DSLAM generates a flow table entry according to the flow table information.

Optionally, after step 804, the interaction process may further include:

feeding back, by the DSLAM, a flow table entry generation result to the OLT by using the Ethernet packet, so that the OLT determines whether to repeatedly send the Ethernet packet including the flow table information to the DSLAM.

In the embodiment shown in FIG. 8, that the access device is a DSLAM and the central device is an OLT is only used as an example for description. Alternatively, the access device may be a Cable Modem Termination System (CMTS) or a switch device, and the central device may be an edge device of an IP network, for example, a common router or a Broadband Remote Access Server (BRAS).

Optionally, the Ethernet packet carries the URI of the configuration file, and the obtaining, by the DSLAM, the flow table information according to the Ethernet packet includes:

accessing, by the access device, the configuration file according to the URI, carried in the Ethernet packet, of the configuration file, to obtain the flow table information from the configuration file.

Figure 9:
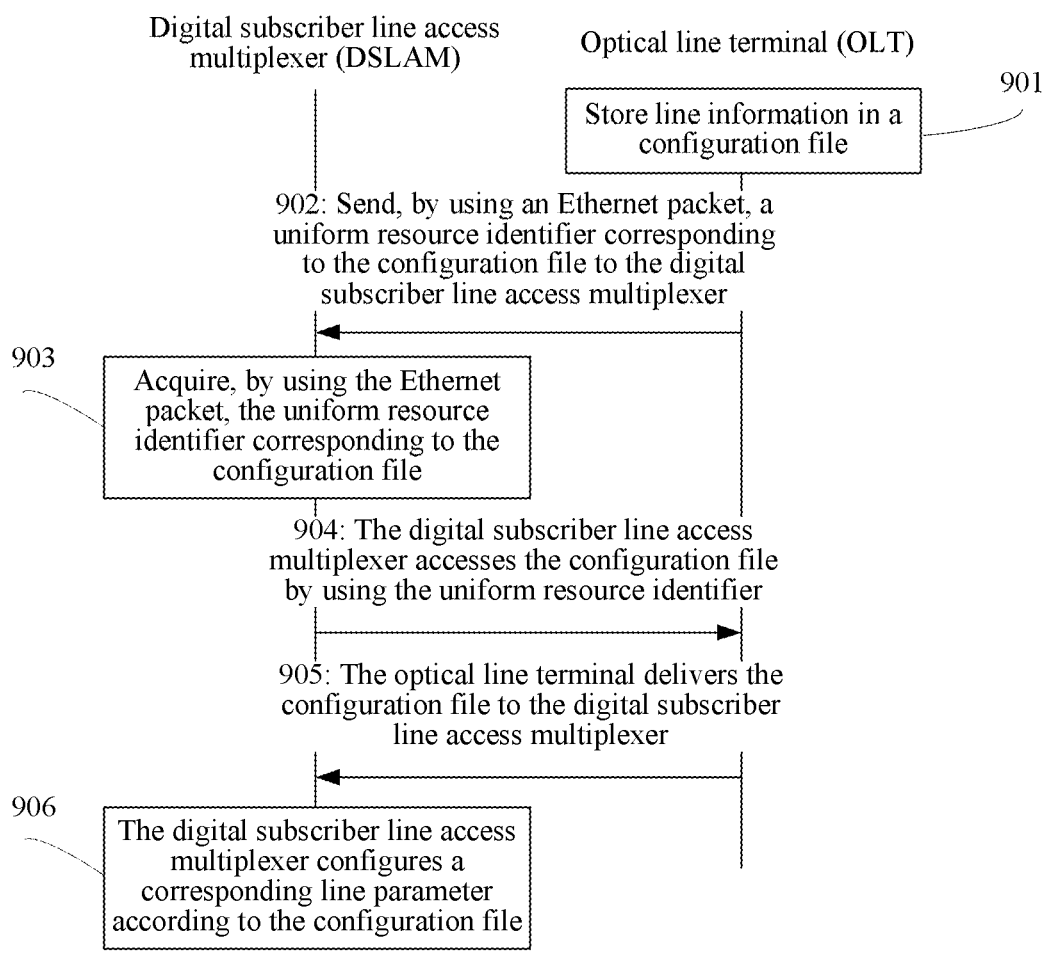
FIG. 9 is a schematic diagram of an interaction process between a DSLAM and an OLT according to an embodiment of the present invention.

Referring to FIG. 9, FIG. 9 is a schematic diagram of an interaction process between the DSLAM and the OLT when the DSLAM obtains the line management information by using the Ethernet packet. The interaction process includes the following steps:

901: The OLT stores the line information in the configuration file. In this embodiment of the present invention, an example in which the configuration file is stored in the OLT is used. The configuration file may further be stored in a network management device or a server.

902: The OLT sends, by using the Ethernet packet, the URI corresponding to the configuration file to the DSLAM.

903: The DSLAM acquires, by using the Ethernet packet, the URI corresponding to the configuration file.

904: The DSLAM accesses the configuration file by using the URI. When the configuration file is stored in the OLT, the DSLAM accesses the configuration file in the OLT by using the URI; when the configuration file is stored in another network device, the DSLAM accesses the another network device by using the URI to acquire the configuration file.

905: The OLT delivers the configuration file to the DSLAM.

906: The DSLAM configures a corresponding line parameter according to the configuration file. The line management information is stored in the configuration file, and the DSLAM configures the access device according to the line management information, to configure and manage the access line.

A format of the Ethernet packet is the same as the format of the Ethernet packet shown in FIG. 7a or FIG. 7b, and is not described herein again.

According to the foregoing technical solution, an access device generates a flow table entry by receiving a layer 2 protocol packet sent by a central device. The access device can obtain flow table information from the central device without the need of configuring a public IP address for the access device and without the need of operating TCP/IP, so as to help implement that user equipment accesses an IP network by using the access device, avoiding a waste of a public IP address; moreover, the central device controls delivery of all flow table information together, and it is unnecessary to independently configure a flow table entry for the access device, which helps simplify management and maintenance of the access device.

Figure 10:
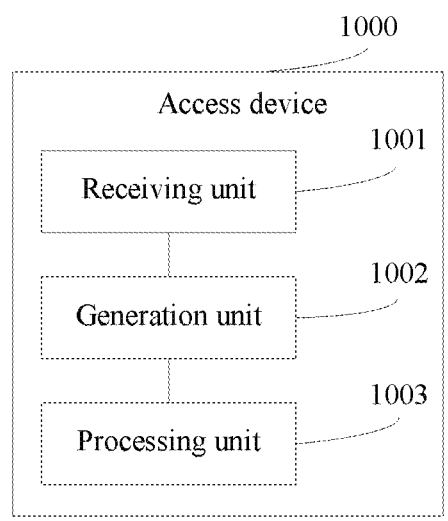
FIG. 10 is a schematic structural diagram of an access device according to an embodiment of the present invention.

Referring to FIG. 10, an embodiment of the present invention further provides an access device 1000 in an access network. The access device 1000 may be the access device in the method shown in FIG. 2. The access device 1000 includes:

a receiving unit 1001, configured to receive a layer 2 protocol packet sent by a central device, where a destination address of the layer 2 protocol packet is a Media Access Control MAC address of the access device 1000, the access device 1000 is configured to connect to user equipment, and the central device is configured to connect the access device 1000 to an IP network;

a generation unit 1002, configured to obtain flow table information according to the layer 2 protocol packet received by the receiving unit 1001, where the flow table information includes a match field and an instruction, and generate a flow table entry according to the flow table information, where the flow table entry includes the match field and the instruction, where the receiving unit 1001 is further configured to receive a service packet sent by the user equipment; and a processing unit 1003, configured to determine a matching flow table entry according to the service packet received by the receiving unit 1001, and when the matching flow table entry is the generated flow table entry, process the service packet according to the instruction in the generated flow table entry.

Optionally, when a GPON or a next-generation GPON is between the access device 1000 and the central device, the central device is an OLT, the access device 1000 is an ONU, and the layer 2 protocol packet received by the receiving unit 1001 is an OMCI protocol packet.

Optionally, the OMCI protocol packet received by the receiving unit 1001 carries an OpenFlow message, where the OpenFlow message carries the flow table information, and the OMCI protocol packet includes a first message identifier, where the first message identifier is used to identify that the OMCI protocol packet carries the OpenFlow message; and the generation unit is specifically configured to: when it is determined that the OMCI protocol packet carries the first message identifier, obtain the flow table information according to the OpenFlow message carried in the OMCI protocol packet.

Optionally, the OMCI protocol packet received by the receiving unit 1001 carries a URI of a configuration file, and the OMCI protocol packet includes a second message identifier, where the second message identifier is used to identify that the OMCI protocol packet carries the URI; and the generation unit is specifically configured to: when it is determined that the OMCI protocol packet carries the second message identifier, access, by the access device 1000, the configuration file according to the URI, to obtain the flow table information from the configuration file.

Optionally, the configuration file further includes line management information, where the line management information includes: a type of an access line on a user side of the access device 1000 and a physical layer parameter of the access line, and the line management information is used by the access device 1000 to configure and manage the access line; and the access device 1000 further includes:

an acquiring unit, configured to access the configuration file according to the URI of the configuration file, to obtain the line management information from the configuration file.

For the OMCI protocol packet, reference may be made to FIG. 3*a*. The OMCI protocol packet is already described in detail in the foregoing method embodiment, and is not described herein again.

Optionally, when an Ethernet passive optical network EPON or a next-generation EPON is between the access device 1000 and the central device, the central device is an OLT, the access device 1000 is an ONU, and the layer 2 protocol packet received by the receiving unit is an Ethernet packet.

Optionally, when either of an Ethernet network and an IP network is between the access device 1000 and the central device, the central device is either of an edge device of the IP network and an OLT, the access device 1000 is a DSLAM, and the layer 2 protocol packet received by the receiving unit is an Ethernet packet.

Optionally, a payload part of the Ethernet packet carries an OpenFlow message, and the Ethernet packet includes a third message identifier, where the third message identifier is used to identify that the Ethernet packet carries the OpenFlow message; and the generation unit 1002 is specifically configured to obtain flow table information according to the OpenFlow message carried in the payload part of the Ethernet packet.

Optionally, the Ethernet packet carries a uniform resource identifier URI of a configuration file, and the Ethernet packet includes a fourth message identifier, where the fourth message identifier is used to identify that the Ethernet packet carries the URI; and the generation unit 1002 is specifically configured to: when it is determined that the Ethernet packet carries the fourth message identifier, access the configuration file according to the URI, carried in the Ethernet packet, of the configuration file, to obtain the flow table information from the configuration file.

Optionally, the configuration file further includes line management information, where the line management information includes: a type of an access line on a user side of the access device 1000 and a physical layer parameter of the access line, and the line management information is used by the access device 1000 to configure and manage the access line; and the access device 1000 further includes:

an acquiring unit, configured to access the configuration file according to the URI carried in the Ethernet packet, to obtain the line management information from the configuration file.

For the Ethernet packet, reference may be made to FIG. 7*a* and FIG. 7*b*. The Ethernet packet is already described in detail in the foregoing method embodiment, and is not described herein again.

Optionally, the access device 1000 may further be a cable modem termination system (Cable Modem Termination System, CMTS), a cable modem (Cable Modem, CM) device, a converged cable access platform (Converged Cable Access Platform, CCAP) device, or a switch device.

According to the foregoing technical solution, the access device 1000 receives a layer 2 protocol packet sent by a central device, obtains flow table information by using the layer 2 protocol packet, and generates a flow table entry. The access device 1000 can obtain the flow table information from the central device without the need of independently configuring a public IP address for the access device 1000 and without the need of operating TCP/IP, so as to help implement that user equipment accesses an IP network by using the access device 1000, avoiding a waste of a public IP address; moreover, the central device controls delivery of all flow table information together, and it is unnecessary to independently configure a flow table entry for the access device 1000, which helps simplify management and maintenance of the ONU.

Figure 11:
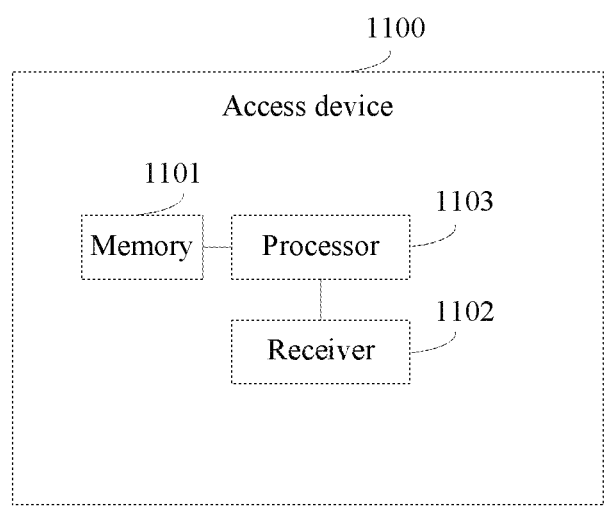
FIG. 11 is a schematic structural diagram of an access device according to an embodiment of the present invention.

Referring to FIG. 11, an embodiment of the present invention further provides an access device 1100. The access device 1100 may be the access device in the method shown in FIG. 2. The access device 1100 includes: a memory 1101, a receiver 1102, and a processor 1103 separately connected to the memory 1101 and the receiver 1102. The memory 1101 is configured to store a group of program instructions, and the processor 1103 is configured to invoke the program instructions stored in the memory 1101, to perform the following operations:

triggering the receiver 1102 to receive a layer 2 protocol packet sent by a central device, where a destination address of the layer 2 protocol packet is a MAC address of the access device 1100, the access device 1100 is configured to connect to user equipment, and the central device is configured to connect the access device 1100 to an IP network;

obtaining flow table information according to the layer 2 protocol packet received by the receiver 1102, where the flow table information includes a match field and an instruction, and generating a flow table entry according to the flow table information, where the flow table entry includes the match field and the instruction;

triggering the receiver 1102 to receive a service packet sent by the user equipment; and determining a matching flow table entry according to the service packet, and when the matching flow table entry is the generated flow table entry, processing the service packet according to the instruction in the generated flow table entry.

Optionally, when a GPON or a next-generation GPON is between the access device 1100 and the central device, the central device is an OLT, the access device 1100 is an ONU, and the layer 2 protocol packet received by the receiver 1102 is an OMCI protocol packet.

Optionally, the OMCI protocol packet received by the receiver 1102 carries an OpenFlow message, where the OpenFlow message carries the flow table information, and the OMCI protocol packet includes a first message identifier, where the first message identifier is used to identify that the OMCI protocol packet carries the OpenFlow message; and the processor 1103 is specifically configured to: when it is determined that the OMCI protocol packet carries the first message identifier, obtain the flow table information according to the OpenFlow message carried in the OMCI protocol packet.

Optionally, the OMCI protocol packet received by the receiver 1102 carries a URI of a configuration file, and the OMCI protocol packet includes a second message identifier, where the second message identifier is used to identify that the OMCI protocol packet carries the URI; and the processor 1103 is specifically configured to: when it is determined that the OMCI protocol packet carries the second message identifier, access the configuration file according to the URI, to obtain the flow table information from the configuration file.

Optionally, the configuration file further includes line management information, where the line management information includes: a type of an access line on a user side of the access device and a physical layer parameter of the access line, and the line management information is used by the access device to configure and manage the access line; and the processor 1103 is further configured to access the configuration file according to the URI of the configuration file, to obtain the line management information from the configuration file.

For the OMCI protocol packet, reference may be made to FIG. 3a. The OMCI protocol packet is already described in detail in the foregoing method embodiment, and is not described herein again.

Optionally, when an EPON or a next-generation EPON is between the access device 1100 and the central device, the central device is an OLT, the access device 1100 is an ONU, and the layer 2 protocol packet received by the receiver 1102 is an Ethernet packet.

Optionally, when either of an Ethernet network and an IP network is between the access device 1100 and the central device, the central device 1100 is either of an edge device of the IP network and an OLT, the access device 1100 is a DSLAM, and the layer 2 protocol packet received by the receiver 1102 is an Ethernet packet.

Optionally, a payload part of the Ethernet packet carries an OpenFlow message, and the Ethernet packet includes a third message identifier, where the third message identifier is used to identify that the Ethernet packet carries the OpenFlow message; and the processor 1103 is specifically configured to obtain flow table information according to the OpenFlow message carried in the payload part of the Ethernet packet.

Optionally, the Ethernet packet carries a URI of a configuration file, and the Ethernet packet includes a fourth message identifier, where the fourth message identifier is used to identify that the Ethernet packet carries the URI; and the processor 1103 is specifically configured to: when it is determined that the Ethernet packet carries the fourth message identifier, access, by the access device 1100, the configuration file according to the URI, carried in the Ethernet packet, of the configuration file, to obtain the flow table information from the configuration file.

Optionally, the configuration file further includes line management information, where the line management information includes: a type of an access line on a user side of the access device 1100 and a physical layer parameter of the access line, and the line management information is used by the access device 1100 to configure and manage the access line; and the processor 1103 of the access device is further configured to access the configuration file according to the URI carried in the Ethernet packet, to obtain the line management information from the configuration file.

For the Ethernet packet, reference may be made to FIG. 7a and FIG. 7b. The Ethernet packet is already described in detail in the foregoing method embodiment, and is not described herein again.

Optionally, the processor 1103 may be a CPU, the memory 1101 may be an internal memory of an RAM type, and the receiver 1102 may include a common physical interface, where the physical interface may be an Ethernet interface or an ATM interface. The processor 1103, the receiver 1102, and the memory 1101 may be integrated into one or more independent circuits or one or more pieces of independent hardware, for example, an ASIC.

Optionally, the access device 1100 may further be a cable modem termination system (Cable Modem Termination System, CMTS), a cable modem (Cable Modem, CM) device, a converged cable access platform (Converged Cable Access Platform, CCAP) device, or a switch device.

According to the foregoing technical solution, the access device 1100 generates a flow table entry by receiving a layer 2 protocol packet sent by a central device. The access device 1100 can obtain flow table information from the central device without the need of configuring a public IP address for the access device 1100 and without the need of operating TCP/IP, so as to help implement that user equipment accesses an IP network by using the access device 1100, avoiding a waste of a public IP address; moreover, the central device controls delivery of all flow table information together, and it is unnecessary to independently configure a flow table entry for the access device 1000, which helps implement management and maintenance of the access device 1100.

Figure 12:
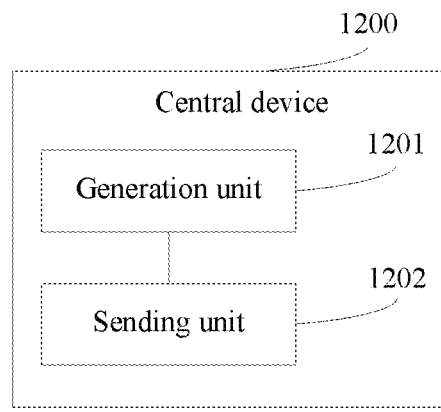
FIG. 12 is a schematic structural diagram of a central device according to an embodiment of the present invention.

Referring to FIG. 12, an embodiment of the present invention further provides a central device 1200 in an access network. The central device 1200 may be the central device in the method shown in FIG. 2. The central device 1200 includes:

a generation unit 1201, configured to generate a layer 2 protocol packet, where a destination address of the layer 2 protocol packet is a MAC address of an access device, the layer 2 protocol packet carries flow table information, the central device 1200 is configured to connect the access device to an IP network, and the access device is configured to connect to user equipment; and a sending unit 1202, configured to send the layer 2 protocol packet generated by the generation unit to the access device.

Optionally, when a GPON or a next-generation GPON is between the access device and the central device 1200, the central device 1200 is an OLT, the access device is an ONU, and the layer 2 protocol packet is an OMCI protocol packet, where the OMCI protocol packet carries an OpenFlow message, and the OpenFlow message carries the flow table information.

For the OMCI protocol packet, reference may be made to FIG. 3*a*. The OMCI protocol packet is already described in detail in the foregoing method embodiment, and is not described herein again.

Optionally, when an EPON or a next-generation EPON is between the access device and the central device 1200, the central device 1200 is an OLT, the access device is an ONU, and the layer 2 protocol packet is an Ethernet packet, where a payload part of the Ethernet packet carries an OpenFlow message.

Optionally, the OMCI protocol packet carries a URI of a configuration file, and the configuration file includes the flow table information.

For the Ethernet packet, reference may be made to FIG. 7*a* and FIG. 7*b*. The Ethernet packet is already described in detail in the foregoing method embodiment, and is not described herein again.

Optionally, the configuration file further includes line management information, where the line management information includes: a type of an access line on a user side of the access device and a physical layer parameter of the access line, and the line management information is used by the access device to configure and manage the access line. The access device may access the configuration file according to the URI of the configuration file, to obtain the line management information from the configuration file. The access device acquires the line management information from the configuration file, which avoids a technical problem in the prior art that multiple MEs need to be generated when the central device needs to deliver the line management information including multiple pieces of parameter information, and that causes management and maintenance difficulties.

According to the foregoing technical solution, the central device 1200 generates a layer 2 protocol packet, where the layer 2 protocol packet carries flow table information, and sends the layer 2 protocol packet to an access device. The access device can obtain the flow table information from the central device 1200 without the need of independently configuring a public IP address for the access device, so as to implement that user equipment accesses an IP network by using the access device, avoiding a waste of a public IP address; moreover, the central device 1200 controls delivery of all flow table information together, and it is unnecessary to independently configure a flow table entry for the access device, which helps simplify management and maintenance of the access device.

Figure 13:
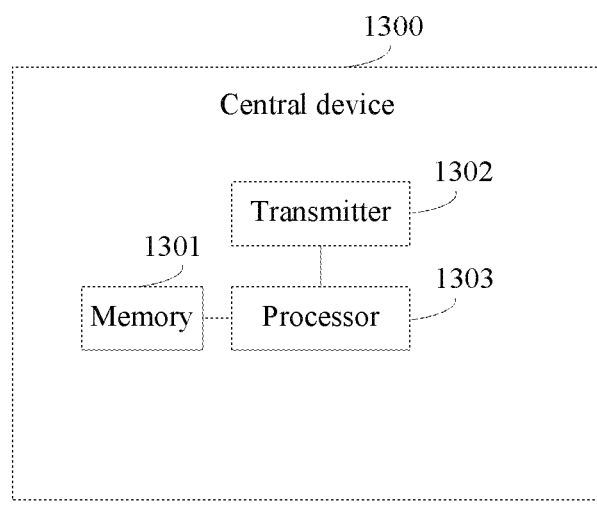
FIG. 13 is a schematic structural diagram of a central device according to an embodiment of the present invention.

Referring to FIG. 13, an embodiment of the present invention further provides a central device 1300. The central device 1300 may be the central device in the method shown in FIG. 2. The central device 1300 includes: a memory 1301, a transmitter 1302, and a processor 1303 separately connected to the memory 1301 and the transmitter 1302. The memory 1301 is configured to store a group of program instructions, and the processor 1303 is configured to invoke the program instructions stored in the memory 1301, to perform the following operations:

generating a layer 2 protocol packet, where a destination address of the layer 2 protocol packet is a MAC address of an access device, the layer 2 protocol packet carries flow table information, the central device 1300 is configured to connect the access device to an IP network, and the access device is configured to connect to user equipment; and triggering the transmitter 1302 to send the layer 2 protocol packet generated by the processor 1303 to the access device.

Optionally, when a GPON or a next-generation GPON is between the access device and the central device 1300, the central device 1300 is an OLT, the access device is an ONU, and the layer 2 protocol packet is an OMCI protocol packet, where the OMCI protocol packet carries an OpenFlow message, and the OpenFlow message carries the flow table information.

For the OMCI protocol packet, reference may be made to FIG. 3*a*. The OMCI protocol packet is already described in detail in the foregoing method embodiment, and is not described herein again.

Optionally, when an EPON or a next-generation EPON is between the access device and the central device 1300, the central device 1300 is an OLT, the access device is an ONU, and the layer 2 protocol packet is an Ethernet packet, where a payload part of the Ethernet packet carries an OpenFlow message.

Optionally, the OMCI protocol packet carries a URI of a configuration file, and the configuration file includes the flow table information.

For the Ethernet packet, reference may be made to FIG. 7*a* and FIG. 7*b*. The Ethernet packet is already described in detail in the foregoing method embodiment, and is not described herein again.

Optionally, the configuration file further includes line management information, where the line management information includes: a type of an access line on a user side of the access device and a physical layer parameter of the access line, and the line management information is used by the access device to configure and manage the access line. The access device may access the configuration file according to the URI of the configuration file, to obtain the line management information from the configuration file. The access device acquires the line management information from the configuration file, which avoids a technical problem in the prior art that multiple MEs need to be generated when the central device needs to deliver the line management information including multiple pieces of parameter information, and that causes management and maintenance difficulties.

According to the foregoing technical solution, the central device 1300 generates a layer 2 protocol packet, where the layer 2 protocol packet carries flow table information, and sends the layer 2 protocol packet to an access device. The access device can obtain the flow table information from the central device 1300 without the need of independently configuring a public IP address for the access device and without the need of operating TCP/IP, so as to help implement that user equipment accesses an IP network by using the access device, avoiding a waste of a public IP address; moreover, the central device 1300 controls delivery of all flow table information together, and it is unnecessary to independently configure a flow table entry for the access device, which helps simplify management and maintenance of the access device.

Optionally, the processor 1303 may be a CPU, the memory 1301 may be an internal memory of an RAM type, and the transmitter 1302 may include a common physical interface, where the physical interface may be an Ethernet interface or an ATM interface. The processor 1303, the transmitter 1302, and the memory 1301 may be integrated into one or more independent circuits or one or more pieces of independent hardware, for example, an ASIC.

Persons of ordinary skill in the art may understand that all or a part of the steps of the method in the embodiments of the present invention may be implemented by a program instructing relevant hardware. The program may be stored in a computer readable storage medium. When the program runs, the steps of the method in the embodiments of the present invention are performed. The storage medium may be at least one of the following media: media that are capable of storing program code, such as a Read-Only Memory (Read-Only Memory, ROM for short), a RAM, a magnetic disk, or an optical disc.

Finally, it should be noted that the foregoing embodiments are merely intended for exemplarily describing the technical solutions of the present invention other than limiting the present invention. Although the present invention and benefits of the present invention are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of the present invention.

What is claimed is:

1. A method for processing a packet in an access network, comprising:
    receiving, by an access device, a layer 2 protocol packet sent by a central device, wherein a destination address of the layer 2 protocol packet is a Media Access Control (MAC) address of the access device, the access device is configured to connect to user equipment, and the central device is configured to connect the access device to an Internet Protocol (IP) network;
    obtaining, by the access device, flow table information according to the layer 2 protocol packet, wherein the flow table information comprises a match field and an instruction, and generating, by the access device, a flow table entry according to the flow table information, wherein the flow table entry comprises the match field and the instruction;
    receiving, by the access device, a service packet sent by the user equipment; and
    determining, by the access device, a matching flow table entry according to the service packet, and when the matching flow table entry is the generated flow table entry, processing the service packet according to the instruction in the generated flow table entry;
    wherein when a gigabit passive optical network (GPON) or a next-generation GPON is between the access device and the central device, the central device is an optical line terminal (OLT), the access device is an optical network unit (ONU), and the layer 2 protocol packet is an optical network terminal (ONT) management and control interface (OMCI) protocol packet;
    wherein the OMCI protocol packet carries a uniform resource identifier (URI) of a configuration file, and the OMCI protocol packet comprises a second message identifier, where the second message identifier is used to identify that the OMCI protocol packet carries the URI; and the obtaining, by the access device, flow table information according to the layer 2 protocol packet comprises:
    when the access device determines that the OMCI protocol packet carries the second message identifier, accessing, by the access device, the configuration file according to the URI, to obtain the flow table information from the configuration file.

2. The method according to claim 1, wherein the OMCI protocol packet carries an OpenFlow message, wherein the OpenFlow message carries the flow table information, and the OMCI protocol packet comprises a first message identifier, wherein the first message identifier is used to identify that the OMCI protocol packet carries the OpenFlow message; and the obtaining, by the access device, flow table information according to the layer 2 protocol packet comprises:
    when the access device determines that the OMCI protocol packet carries the first message identifier, obtaining, by the access device, the flow table information according to the OpenFlow message carried in the OMCI protocol packet.

3. The method according to claim 1, wherein the configuration file further comprises line management information, where the line management information comprises: a type of an access line on a user side of the access device and a physical layer parameter of the access line, and the line management information is used by the access device to configure and manage the access line; and the method further comprises:
    accessing, by the access device, the configuration file according to the URI of the configuration file, to obtain the line management information from the configuration file.

4. The method according to claim 1, wherein when an Ethernet passive optical network EPON or a next-generation EPON is between the access device and the central device, the central device is an OLT, the access device is an ONU, and the layer 2 protocol packet is an Ethernet packet.

5. The method according to claim 1, wherein when either of an Ethernet network and an IP network is between the access device and the central device, the central device is either of an edge device of the IP network and an OLT, the access device is a digital subscriber line access multiplexer DSLAM, and the layer 2 protocol packet is an Ethernet packet.

6. The method according to claim 4, wherein a payload part of the Ethernet packet carries an OpenFlow message, and the Ethernet packet comprises a third message identifier, wherein the third message identifier is used to identify that the Ethernet packet carries the OpenFlow message; and the obtaining, by the access device, flow table information according to the Ethernet packet comprises:
    when the access device determines that the Ethernet packet carries the third message identifier, obtaining, by the access device, the flow table information according to the OpenFlow message carried in the payload part of the Ethernet packet.

7. The method according to claim 4, wherein the Ethernet packet carries a URI of a configuration file, and the Ethernet packet comprises a fourth message identifier, wherein the fourth message identifier is used to identify that the Ethernet packet carries the URI, and the obtaining, by the access device, flow table information according to the layer 2 protocol packet comprises:

when the access device determines that the Ethernet packet carries the fourth message identifier, accessing, by the access device, the configuration file according to the URI, carried in the Ethernet packet, of the configuration file, to obtain the flow table information from the configuration file.

8. The method according to claim 7, wherein the configuration file further comprises line management information, wherein the line management information comprises: a type of an access line on a user side of the access device and a physical layer parameter of the access line, and the line management information is used by the access device to configure and manage the access line; and the method further comprises:

accessing, by the access device, the configuration file according to the URI carried in the Ethernet packet, to obtain the line management information from the configuration file.

9. An access device in an access network, wherein the access device comprises:

a memory to store instructions; and a processor to execute the instructions to cause the access device to:

receive a layer 2 protocol packet sent by a central device, wherein a destination address of the layer 2 protocol packet is a Media Access Control (MAC) address of the access device, the access device is configured to connect to user equipment, and the central device is configured to connect the access device to an Internet Protocol (IP) network; wherein when a gigabit passive optical network (GPON) or a next-generation GPON is between the access device and the central device, the central device is an optical line terminal (OLT), the access device is an optical network unit (ONU), and the layer 2 protocol packet is an optical network terminal (ONT) management and control interface (OMCI) protocol packet; wherein the OMCI protocol packet carries a uniform resource identifier (URI) of a configuration file, and the OMCI protocol packet comprises a second message identifier, where the second message identifier is used to identify that the OMCI protocol packet carries the URI; and when the access device determines that the OMCI protocol packet carries the second message identifier, access the configuration file according to the URI, to obtain flow table information from the configuration file;

obtain the flow table information according to the layer 2 protocol packet received by the receiving unit, wherein the flow table information comprises a match field and an instruction, and generate a flow table entry according to the flow table information, wherein the flow table entry comprises the match field and the instruction;

receive a service packet sent by the user equipment; and determine a matching flow table entry according to the service packet, and when the matching flow table entry is the generated flow table entry, process the service packet according to the instruction in the generated flow table entry.

10. The access device according to claim 9, wherein the OMCI protocol packet carries an OpenFlow message, wherein the OpenFlow message carries the flow table information, and the OMCI protocol packet comprises a first message identifier, wherein the first message identifier is used to identify that the OMCI protocol packet carries the OpenFlow message; and the access device is configured to: when it is determined that the OMCI protocol packet carries the first message identifier, obtain the flow table information according to the OpenFlow message carried in the OMCI protocol packet.

11. The access device according to claim 9, wherein the configuration file further comprises line management information, wherein the line management information comprises: a type of an access line on a user side of the access device and a physical layer parameter of the access line, and the line management information is used by the access device to configure and manage the access line; and the access device is further configured to access the configuration file according to the URI of the configuration file, to obtain the line management information from the configuration file.

12. The access device according to claim 9, wherein when an Ethernet passive optical network (EPON) or a next-generation EPON is between the access device and the central device, the central device is an OLT, the access device is an ONU, and the layer 2 protocol packet received by the access device is an Ethernet packet.

13. The access device according to claim 9, wherein when either of an Ethernet network and an IP network is between the access device and the central device, the central device is either of an edge device of the IP network and an OLT, the access device is a digital subscriber line access multiplexer (DSLAM), and the layer 2 protocol packet received by the access device is an Ethernet packet.

14. A central device in an access network, wherein the central device comprises:

a memory to store instructions; and a processor to execute the instructions to cause the central device to: generate a layer 2 protocol packet, wherein a destination address of the layer 2 protocol packet is a Media Access Control (MAC) address of an access device, the layer 2 protocol packet carries flow table information, the central device is configured to connect the access device to an Internet Protocol IP network, and the access device is configured to connect to user equipment; wherein when a gigabit passive optical network (GPON) or a next-generation GPON is between the access device and the central device, the central device is an optical line terminal (OLT), the access device is an optical network unit (ONU), and the layer 2 protocol packet is an optical network terminal (ONT) management and control interface (OMCI) protocol packet; wherein the OMCI protocol packet carries a uniform resource identifier (URI) of a configuration file, and the OMCI protocol packet comprises a second message identifier, where the second message identifier is used to identify that the OMCI protocol packet carries the URI; and when the access device determines that the OMCI protocol packet carries the second message identifier, access the configuration file according to the URI, to obtain the flow table information from the configuration file; and send the layer 2 protocol packet generated by the central device to the access device.

15. The central device according to claim 14, wherein when an Ethernet passive optical network (EPON) or a next-generation EPON is between the access device and the central device, the central device is an OLT, the access device is an ONU, and the layer 2 protocol packet is an Ethernet packet, wherein a payload part of the Ethernet packet carries an OpenFlow message, and the OpenFlow message carries the flow table information.

* * * * *